US007647019B2

(12) United States Patent
Kim

(10) Patent No.: US 7,647,019 B2
(45) Date of Patent: Jan. 12, 2010

(54) APPARATUS AND METHOD FOR RECEIVING DIGITAL MULTIMEDIA BROADCAST SERVICE IN A MOBILE TERMINAL

(75) Inventor: Tae-Il Kim, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 551 days.

(21) Appl. No.: 11/641,159

(22) Filed: Dec. 19, 2006

(65) Prior Publication Data

US 2007/0199026 A1 Aug. 23, 2007

(30) Foreign Application Priority Data

Dec. 19, 2005 (KR) ..................... 10-2005-0125416

(51) Int. Cl.
*H04Q 7/20* (2006.01)

(52) U.S. Cl. ................ 455/3.02; 455/456.1; 455/67.11; 455/550.1; 455/553.1; 455/456.6; 342/357.17; 342/357.01; 342/357.12; 342/357.1

(58) Field of Classification Search ....... 455/3.01–3.06, 455/456.1–457, 422.1, 403, 67.11, 12.1, 455/427, 428, 429, 550.1, 566, 552.1, 553.1, 455/500, 517; 342/357.01, 357.12, 357.08, 342/357.1, 357.17
See application file for complete search history.

(56) References Cited

U.S. PATENT DOCUMENTS

2002/0021244 A1* 2/2002 Aizawa et al. ......... 342/357.12
2005/0107045 A1* 5/2005 Kroeger ....................... 455/83
2006/0025152 A1* 2/2006 Ban ....................... 455/456.1

* cited by examiner

*Primary Examiner*—Keith T Ferguson
(74) *Attorney, Agent, or Firm*—The Farrell Law Firm, LLP

(57) ABSTRACT

A method is provided for receiving a Digital Multimedia Broadcasting (DMB) signal by a mobile terminal in a DMB system including a satellite for transmitting a satellite DMB signal directly to the mobile terminal, a gap filler for repeating the satellite DMB signal received from the satellite and transmitting a terrestrial DMB signal to the mobile terminal, and the mobile terminal capable of receiving both the satellite DMB signal and the terrestrial DMB signal. The method includes receiving at least one DMB signal; determining if there is a satellite DMB signal among the at least one DMB signal; if there is the satellite DMB signal calculating a reception frequency of the satellite DMB signal for a stated time; and if the reception frequency is less than or equal to a threshold providing a user with a message recommending detachment of an antenna used for receiving the satellite DMB signal.

17 Claims, 5 Drawing Sheets

APPARATUS AND METHOD FOR RECEIVING DIGITAL MULTIMEDIA BROADCAST SERVICE IN A MOBILE TERMINAL

PRIORITY

This application claims the benefit under 35 U.S.C. § 119 (a) of a Korean Patent Application filed in the Korean Intellectual Property Office on Dec. 19, 2005 and assigned Serial No. 2005-125416, the entire contents of which is incorporated herein by reference.

BACKGROUND OF THE INVENTION

1. Field of the Invention

The present invention relates generally to an apparatus and method for receiving a Digital Multimedia Broadcasting (DMB) service in a mobile station, and in particular, to an apparatus and method for receiving a DMB service using an external antenna in a mobile station.

2. Description of the Related Art

Generally, a digital broadcasting system refers to a system that provides to users advanced services having high video quality and CD-class audio quality, replacing the conventional analog broadcasting. A DMB service is one of the typical digital broadcasting services. The DMB service has been proposed to modulate various multimedia signals such as audio and video signals with digital technology and provide the modulated multimedia signals to fixed, portable, and/or vehicle receivers (or terminals). The DMB service is also referred to as "TV in Hand."

The DMB service is based on Digital Audio Broadcast (DAB) technology, which is digital radio technology. The DMB service, though it is based on the DAB technology, can not only provide the audio service, but is also a multimedia service capable of transmitting moving images, weather information, news, position information, packet data, and the like. Presently, the DMB service is classified into a terrestrial DMB service and a satellite DMB service.

The satellite DMB service adopts a scheme of allowing a satellite to directly transmit signals to receivers, and providing broadcast services to the receivers via terrestrial repeaters. With reference to FIG. 1, a description will now be made of the satellite DMB service.

FIG. 1 is a network architecture diagram of a broadcasting system for providing the up-to-date satellite DMB service.

Referring to FIG. 1, a satellite DMB broadcasting center 100 on the ground transmits broadcast signals to a DMB satellite 106 through a Ku-band (12 GHz to 13 GHz). The signals transmitted from the satellite DMB broadcasting center 100 to the DMB satellite 106 are transmitted by Time Division Multiplexing (TDM) 102 and Code Division Multiplexing (CDM) 104. The DMB satellite 106 processes the received broadcast signals 102 and 104, and transmits the processed broadcast signals back to a receiving terminal 116 on the ground, or a gap filler 108 that serves as a terrestrial repeater.

The DMB satellite 106, when it directly exchanges signals with the terminal 116 on the ground, processes the received broadcast signals into CDM signals 112 in an S-band (2 to 3 GHz) before transmission. The DMB satellite 106, when it transmits signals to the gap filler 108, converts the received broadcast signals into TDM signals 110 in a Ku-band before transmission. Although only one gap filler 108 is shown in FIG. 1, the number of gap fillers is extendable according to characteristic of service areas. The DMB satellite 106 transmits the broadcast signals to the gap filler 108 to provide extended coverage for the broadcast signals transmitted by the satellite, for example into shadow areas (or blanket areas) like a basement. The gap filler 108 converts the broadcast signals transmitted by the DMB satellite 106 into S-band signals, and transmits the S-band signals with radio signals in its area, i.e. shadow area, thereby providing the DMB service to the terminal 116 located in the shadow area. The gap filler 108 transmits transmission broadcast signals 114 together with its uniquely allocated gap filler identifier (ID), and allows the terminal 116 receiving the broadcast signals 114 to identify the gap filler from which it is receiving the broadcast signals. Similarly, the DMB satellite 106 also transmits the broadcast signals 112 along with a unique satellite ID. As a result, the mobile terminal 116 can identify the gap filler or the DMB satellite from which it is receiving the broadcast signals.

The mobile terminal 116 includes an antenna for receiving the broadcast signals transmitted from the gap filler 108 and/or the DMB satellite 106. Generally, the antenna is mounted within the mobile terminal 116, and is referred to as an internal antenna (or embedded antenna). The internal antenna has good reception performance for the broadcast signals transmitted from the gap filler 108, but has very poor reception performance for the broadcast signals transmitted from the DMB satellite 106. Therefore, the mobile terminal (or DMB receiver) 116 is equipped with an additional external antenna to receive the broadcast signals transmitted from the DMB satellite 106.

There is a possible area where the broadcast signals 112 received directly from the DMB satellite 106 and the broadcast signals 114 received from the gap filler 108 coexist. If the mobile terminal 116 uses the external antenna in this area, the broadcast signals 112 and the broadcast signals 114 may serve as interference with each other, causing a decrease in Signal-to-Noise Ratio (SNR) measured by the mobile terminal 116. The decrease in the SNR deteriorates the reception performance, which in turn can cause pauses or result in an impossibility of broadcast viewing.

A description will now be made of the situation in which the SNR decreases.

Generally, in viewing satellite DMB broadcast, users receive satellite DMB broadcast signals with the external antenna attached to the mobile terminal 116, regardless of the current reception performance. This is because the attachment of the external antenna helps improve the antenna gain, increasing reception sensitivity. However, if the user is now viewing the broadcast at the coverage edge of the gap filler 108, the signals received from the gap filler 108 and the signals received from the DMB satellite 106 may be similar in strength. In this situation, the attachment of the external antenna may considerably deteriorate the reception performance. That is, the SNR may decrease.

This phenomenon occurs because the broadcast signals 112 directly received from the DMB satellite 106 and the broadcast signals 114 received from the gap filler 108 have a linear polarization form. The broadcast signals 112 in a circular polarization form, directly received from the DMB satellite 106, can be normally received via the external antenna, but are rarely received via the internal antenna. In addition, the broadcast signals 114 having a linear polarization form, received from the gap filler 108, can be received via both the internal antenna and the external antenna.

The gap filler signal 114 and the satellite signal 112 have a frequency offset with respect to each other. In the situation where the gap filler signal 114 and the satellite signal 112 are received at the similar strength, a receiving modem may recognize the signals 114 and 112 as interference noises. In this case, the use of the internal antenna only, compared with the use of the external antenna, contributes to an increase in the SNR, improving reception performance of the DMB service.

Presently, however, the user has no way to distinguish the area where the external antenna should be used, from the area where the external antenna should not be used. In most cases, the user suffers deterioration in reception quality as he/she cannot discriminate one case requiring the use of the external antenna from the other case not requiring the use of the external antenna. That is, the user may lose the opportunity to receive higher-quality services with the use of the external antenna. In addition, when the user frequently moves between the two areas, the user cannot normally receive the signals, failing to successfully receive the satellite DMB service.

SUMMARY OF THE INVENTION

An aspect of the present invention is to address at least the problems and/or disadvantages and to provide at least the advantages described below. Accordingly, an aspect of the present invention is to provide an apparatus and method for indicating an attachment/detachment time of an external antenna in a terminal receiving a satellite DMB service.

Another aspect of the present invention is to provide an apparatus and method for allowing a terminal receiving a satellite DMB service to constantly receive a high-quality signal.

Further another aspect of the present invention is to provide an apparatus and method for minimizing interference signals in a terminal receiving a satellite DMB service.

Yet another aspect of the present invention is to provide an apparatus and method for receiving optimal satellite DMB service signals.

According to one aspect of the present invention, there is provided a method for receiving a Digital Multimedia Broadcasting (DMB) signal by a mobile terminal in a DMB system including a satellite for transmitting a satellite DMB signal directly to the mobile terminal, a gap filler for repeating the satellite DMB signal received from the satellite and transmitting a terrestrial DMB signal to the mobile terminal, and the mobile terminal capable of receiving both the satellite DMB signal and the terrestrial DMB signal. The method includes receiving at least one DMB signal; determining whether there is a satellite DMB signal in the at least one DMB signal; calculating a frequency of reception of the satellite DMB signal for a stated time, if there is the satellite DMB signal; and providing a user with a message recommending detachment of an antenna used for receiving the satellite DMB signal, if the reception frequency is less than or equal to a threshold.

According to another aspect of the present invention, there is provided an apparatus for receiving a Digital Multimedia Broadcasting (DMB) signal by a mobile terminal in a DMB system including a satellite for transmitting a satellite DMB signal directly to the mobile terminal, a gap filler for repeating the satellite DMB signal received from the satellite and transmitting a terrestrial DMB signal to the mobile terminal, and the mobile terminal capable of receiving both the satellite DMB signal and the terrestrial DMB signal. The apparatus includes an antenna for receiving the satellite DMB signal; an antenna for receiving the terrestrial DMB signal; a DMB signal processor for converting the received DMB signals into user data; a controller for calculating a frequency of reception of the satellite DMB signal for a stated time if there is a satellite DMB signal among received DMB signals, and generating a detach command for the antenna for receiving the satellite DMB signal if the reception frequency is less than or equal to a threshold; and a display for displaying a message recommending detachment of the antenna for receiving the satellite DMB signal for a user according to the detach command received from the controller.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF PREFERRED EMBODIMENTS

Figure 1:
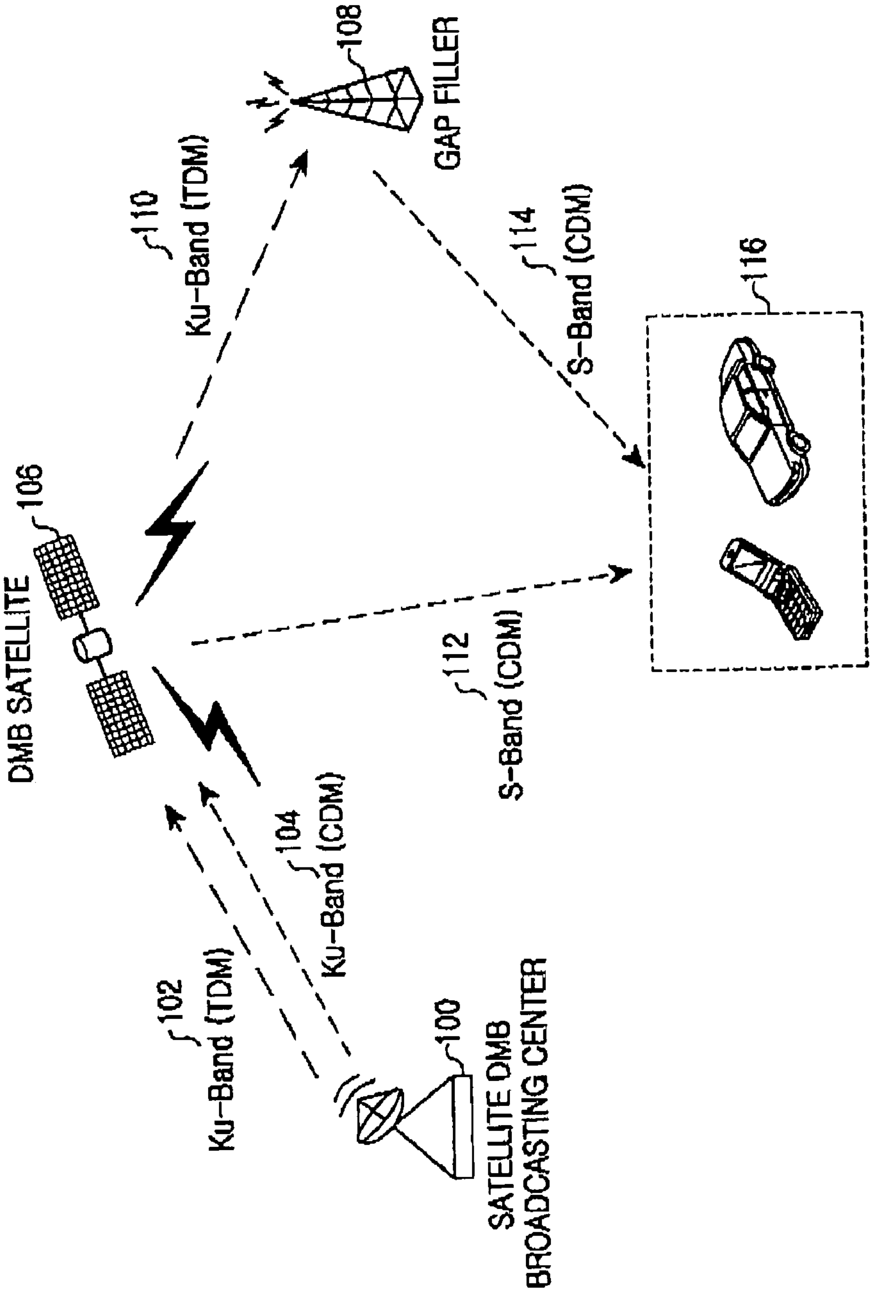
FIG.1 (PRIOR ART)
FIG. 1 is a network architecture diagram of a broadcasting system for providing the up-to-date satellite DMB service.

Several preferred embodiments of the present invention will now be described in detail with reference to the annexed drawings. Throughout the drawings, the same drawing reference numerals will be understood to refer to the same elements, features and structures. In the following description, a detailed description of known functions and configurations incorporated herein has been omitted for clarity and conciseness. Reference to FIG. 1 will be made during the description of the preferred embodiments noting that the description thereof relates to the present invention and not any prior art.

Figure 2:
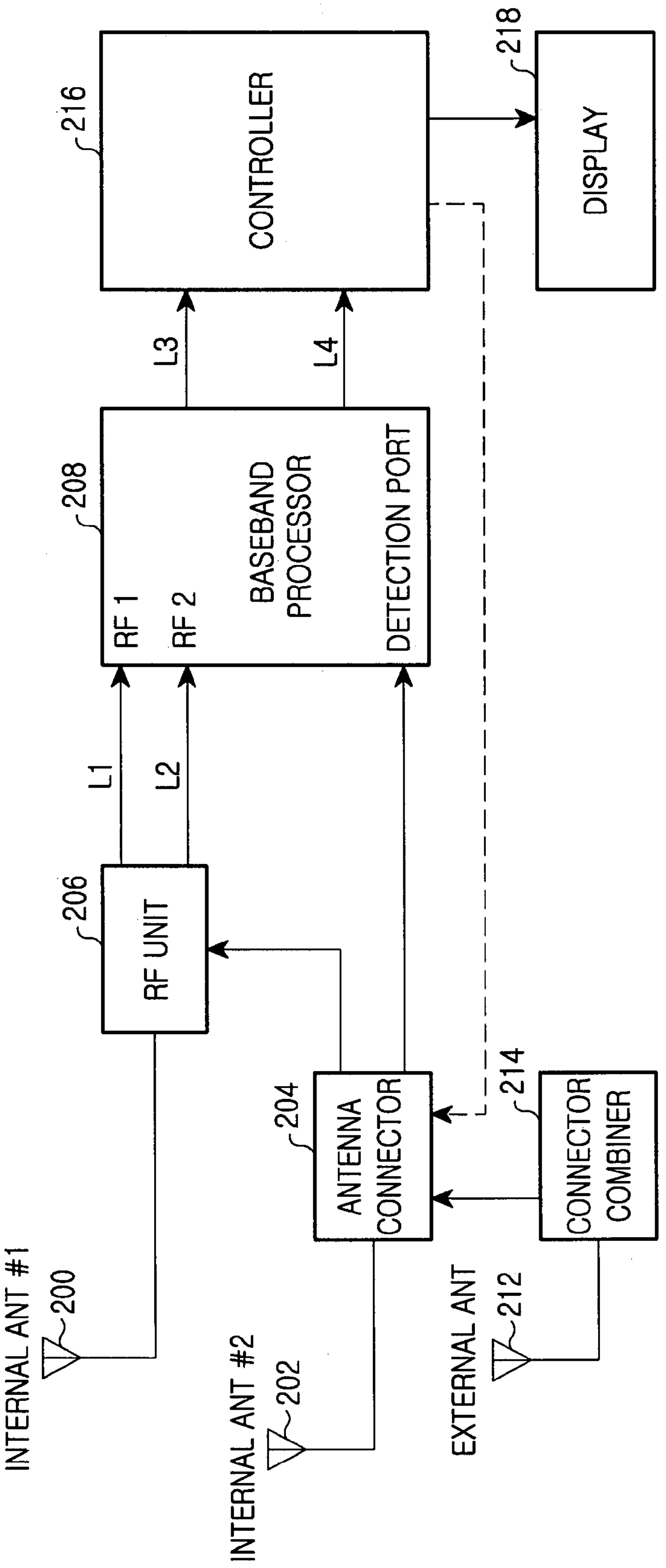
FIG. 2 is a block diagram illustrating an internal structure of a terminal for receiving satellite DMB signals according to the present invention.

FIG. 2 is a block diagram illustrating an internal structure of a terminal for receiving satellite DMB signals according to the present invention. For convenience, the terminal receiving satellite DMB signals will be assumed herein as a mobile terminal. However, the terminal can also be a fixed receiving terminal rather than the mobile terminal. A first internal antenna 200 and a second internal antenna 202 are embedded in the mobile terminal. In the present invention, it is assumed that the mobile terminal has at least two internal antennas in order to obtain diversity in a process of receiving broadcast signals. Optionally, however, the mobile terminal may use only one of the internal antennas. Because the internal antennas generally have very poor reception performance for the broadcast signals 112 transmitted directly from the DMB satellite 106 as described above, the internal antennas will be regarded herein as antennas for receiving the broadcast signals 114 transmitted from the gap filler 108. In addition, the broadcast signals transmitted from the DMB satellite 106 will be referred to as satellite signals 112, and the signals transmitted from the gap filler 108 will be referred to as gap filler signals 114.

The first internal antenna 200 is a dual-band antenna for transmitting and receiving radio signals to/from a general mobile communication system, or for receiving the gap filler signals 114 for providing the satellite DMB service, and is fixedly connected to a Radio Frequency (RF) unit 206.

The second internal antenna 202 is an internal antenna for receiving the gap filler signals 114. By receiving the gap filler signals 114 in this manner, the first and second internal antennas 200 and 202 provide diversity for improving reception performance of the mobile terminal in a multi-path fading environment.

The mobile terminal 116 includes an external antenna 212, which can be detachable or fixed to the mobile terminal 116, provided for receiving the satellite signals 112 transmitted directly from the DMB satellite 106 if strength of the gap filler signals 114 is less than or equal to a reference value or threshold.

A description will first be made of the case where the external antenna 212 is detachable from the mobile terminal 116. The external antenna 212 is physically and electrically connected to an antenna connector 204 through a connector combiner 214. The antenna connector 204 selects one of the broadcast signal received via the second internal antenna 202 and the broadcast signal received via the external antenna 212 according to whether it is connected to the connector combiner 214, and applies the selected signal to the RF unit 206. The antenna connector 204 may include therein a circuit for determining whether the external antenna 212 is connected thereto through the connector combiner 214. This circuit can be composed of only the circuit included in the antenna connector 204, or composed of a circuit associated with a baseband processor 208. A controller 216, in a state where the external antenna 212 is detached from the connector combiner 214, connects the second internal antenna 202 to the RF unit 206 using a switch (not shown), such that the signal received from the first internal antenna 200 and the signal received from the second internal antenna 202 can be processed. On the contrary, in a state where the external antenna 212 is attached to the connector combiner 214, the controller 216 connects the external antenna 212 to the RF unit 206 using the switch, such that the signal received from the first internal antenna 200 and the signal received from the external antenna 212 can be processed. For convenience, the signal received from the first internal antenna 200 will be referred to as a first-path signal, and the signal received from the second internal antenna 202 or the external antenna 212 via the antenna connector 204 will be referred to as a second-path signal.

A description will now be made of the case where the external antenna 212 is constantly attached to the connector combiner 214. In this case, a switch (not shown) is provided in the antenna connector 204, and the controller 216 generates a switching control signal according to the need for the external antenna 212, and applies the generated switching control signal to the antenna connector 204. The antenna connector 204 outputs one of the signal received from the second internal antenna 202 and the signal received from the external antenna 212 to the RF unit 206 according to the switching control signal.

The RF unit 206 includes an RF transmitter (not shown) for up-converting and amplifying the signal to be transmitted to a wireless network, and an RF receiver (not shown) for low-noise-amplifying and down-converting the received signal. The RF unit 206 outputs the first-path signal to a first input terminal RF1 of the baseband processor 208 after processing it, and outputs the second-path signal to a second input terminal RF2 of the baseband processor 208 after processing it.

The baseband processor 208 processes the signals down-converted by the RF unit 206, and receives, at its detection port (or third input terminal), an attachment detection signal of the external antenna 212, i.e. connection of the connector combiner 214 to the antenna connector 204. For convenience, the RF unit 206 and the baseband processor 208 will be referred to as a DMB receiving processor, because a description of the RF unit 206 and the baseband processor 208 will be given herein only for the process of receiving DMB signals. However, it would be obvious to those skilled in the art that the RF unit 206 and the baseband processor 208 can also process non-DMB signals.

An exemplary structure for generating a detachment detection signal of the external antenna 212 connects a pull-up resister between the antenna connector 204 and the baseband processor 208, and applies a high-level signal to the detection port through the pull-up resistor, in the state where the connector combiner 214 is detached from the antenna connector 204. However, in the state where the connector combiner 214 is attached to the antenna connector 204, the structure connects the pull-up resistor to the internal ground, and applies a low-level signal to the detection port.

In another exemplary structure, unlike the above structure in which the baseband processor 208 detects a change in the voltage drop across the pull-up resistor, the antenna connector 204 directly outputs a voltage level signal up onto detachment of the external antenna 212, and the baseband processor 208 or the controller 216 detects the voltage level signal.

The baseband processor 208 processes the broadcast signals received via the first and second paths, demodulates a gap filler ID included in the broadcast signals, and outputs the decoded gap filler ID to the controller 216.

Upon receipt of the gap filler ID from the baseband processor 208, the controller 216 determines a need for attachment/detachment of the external antenna 212, and displays a message recommending attachment/detachment of the external antenna 212 on a display 218 for the user, thereby contributing to improvement of DMB reception performance.

An operation of the controller 216 according to various embodiments of the present invention will now be described in detail herein below.

First Embodiment

A first embodiment of the present invention provides an apparatus and method for allowing the user to detach the external antenna 212 when the attachment of the external antenna 212 deteriorates the reception performance.

Figure 3:
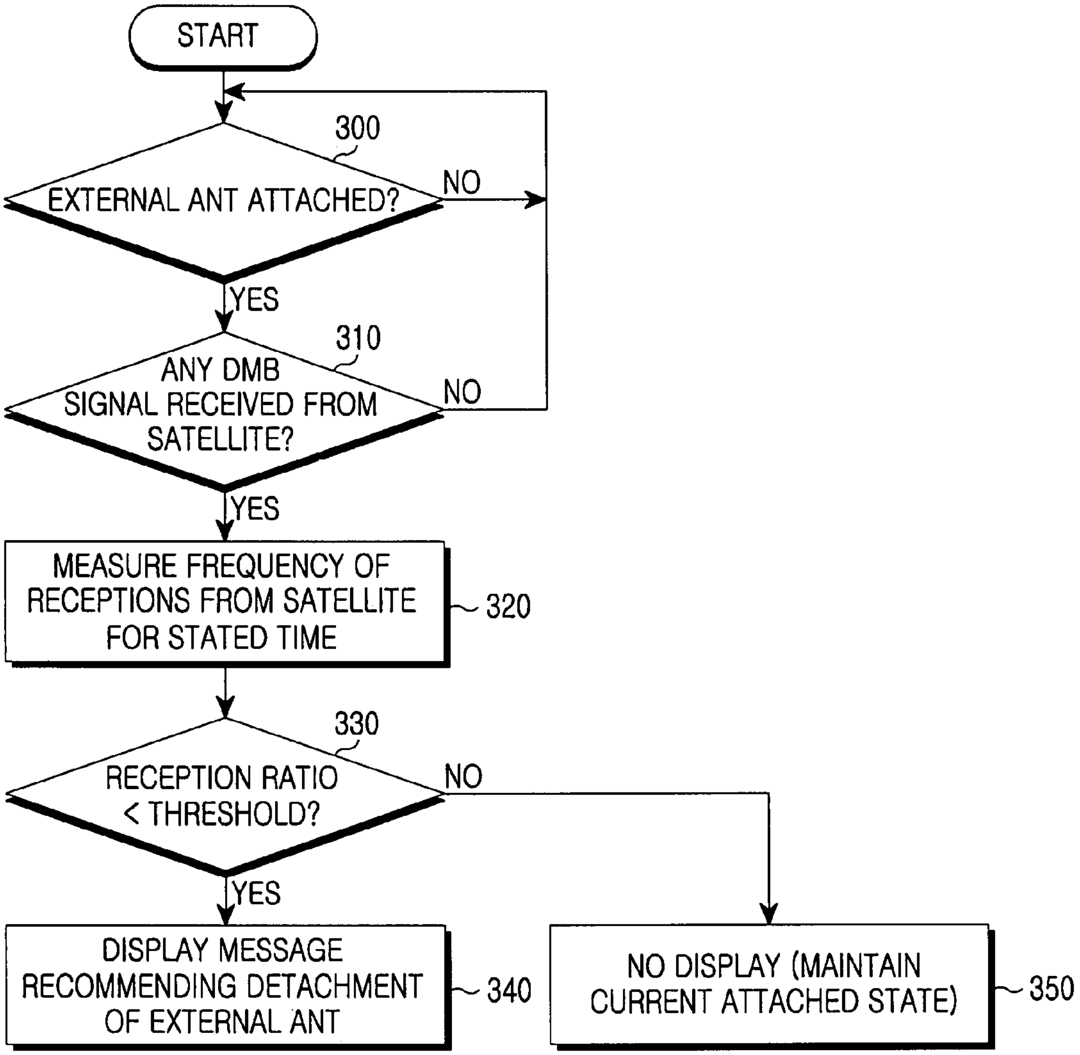
FIG. 3 is a flowchart illustrating a method for improving reception performance according to the present invention.

FIG. 3 is a flowchart illustrating a method for improving reception performance according to the first embodiment of the present invention. The method according to the first exemplary embodiment of the present invention provides a process in which the controller 216 determines a need for detachment of the external antenna 212 and informs the user of the need for the detachment.

In step 300, the controller 216 determines whether the external antenna 212 is attached, depending on an external antenna detachment indication signal L4 received from the baseband processor 208.

If the external antenna 216 is attached, the controller 216 determines in step 310 whether there is any satellite signal 112 currently received from the DMB satellite 106, based on gap filler ID information received from the baseband processor 208. This is possible by determining if there is any gap filler ID specific to the satellite among the gap filler IDs included in the received broadcast signal. The satellite-specific gap filler ID can be stored and managed in a memory (not shown).

If it is determined in step 310 that there is a satellite signal 112, the controller 216 calculates the frequency of reception of the satellite signal for a stated time in step 320. The frequency can be measured by accumulating the number of receiving a gap filler ID having a unique ID of the DMB satellite 106 for a stated time.

Thereafter, in step 330, the controller 216 compares the measured frequency with a threshold α, and determines if the satellite signal 112 and the gap filler signal 114 are similar in reception strength. The threshold a can be optimized through experimentation to correctly determine if the satellite signal 112 and the gap filler signal 114 are received at similar strength.

If the measured frequency is less than or equal to the threshold, the controller 216 allows in step 340 the display 218 to display an antenna detachment recommend message so that the user may recognize the need to detach of the external antenna 212. If the user detaches the external antenna 212 in response to the antenna detachment recommend message, the satellite signal 112 serving as interference abruptly decreases in strength, and the strength of the gap filler signal 114 is maintained or enhanced, thereby improving reception performance of the satellite DMB broadcast signals. On the contrary, if the ratio of reception from the satellite (i.e. the measured frequency of reception of the satellite signal) is greater than the threshold, the controller 216 proceeds to step 350 where it maintains the current attached state. That is, the controller 216 displays no antenna detachment recommend message on the display 218.

With the use of the algorithm used in the first embodiment, it is possible to allow the user to detach the external antenna 212 for the case where detachment of the external antenna 212 will improve the reception performance, and to allow the user to attach the external antenna 212 for the case where attachment of the external antenna 212 will improve the reception performance. In this manner, the mobile terminal can improve its reception performance of the broadcast service in any wireless environment.

Second Embodiment

A second embodiment of the present invention provides an apparatus and method for allowing the user to detach/attach the external antenna 212 according to wireless environment.

Figure 4:
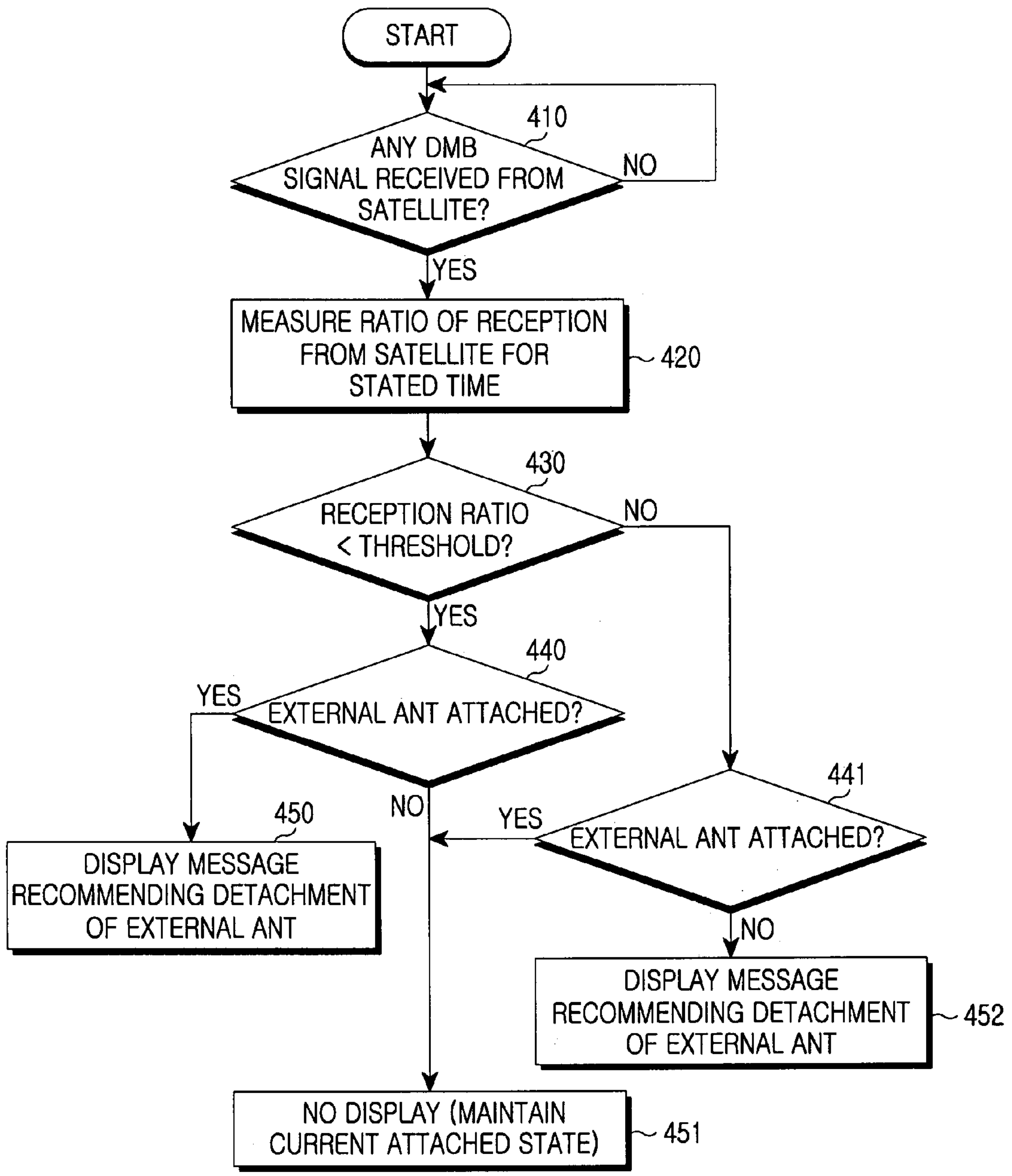
FIG. 4 is a flowchart illustrating a method for controlling attachment of an external antenna according to the present invention.

FIG. 4 is a flowchart illustrating a method for controlling attachment of an external antenna according to a second embodiment of the present invention. A description of the same steps as those described in the first embodiment will partially be omitted for simplicity.

In step 410, the controller 216 determines if there is a satellite signal 112 currently received from the DMB satellite 106. If it is determined that there is a satellite signal 112, the controller 216 calculates the frequency of reception of the satellite signal for a stated time in step 420. In step 430, the controller 216 compares the measured frequency with a threshold, and determines whether the satellite signal 112 and the gap filler signal 114 are received at similar strength.

If the measured frequency is less than or equal to the threshold, the controller 216 determines in step 440 if the external antenna 212 is attached. This process can be achieved in the same manner as done in step 300 of the first embodiment. If the external antenna 212 is attached, the controller 216 allows in step 450 the display 218 to display an antenna detachment recommend message so that the user may recognize the need for detachment of the external antenna 212. However, if the external antenna 212 is not attached, there is no need to display a separate message for the user because the current attached state is advantageous for improvement of the reception performance.

If it is determined in step 430 that the measured frequency is greater than the threshold, the controller 216 determines in step 441 if the external antenna 212 is attached. If it is determined in step 441 that the external antenna 212 is not attached, the controller 216 allows in step 452 the display 218 to display an antenna attachment recommend message so that the user may recognize the need for attachment of the external antenna 212. This is because the attachment of the external antenna 212 is advantageous for improvement of the reception performance, as the frequency of reception of the satellite signal 112 transmitted from the DMB satellite 106 is high in the current wireless environment. However, if the external antenna 212 is attached, there is no need to display a separate message for the user in step 451 because the current attached state is advantageous for improvement of the reception performance.

The threshold used in step 430 can be equal to or different from the threshold used in the first embodiment. This threshold can also be determined through experimentation. Alternatively, a first threshold can be used for determining a need for detachment of the external antenna 212 and a second threshold can be used for determining a need for attachment of the external antenna 212.

Third Embodiment

A third embodiment of the present invention provides an apparatus and method for automatically attaching/detaching an external antenna.

Figure 5:
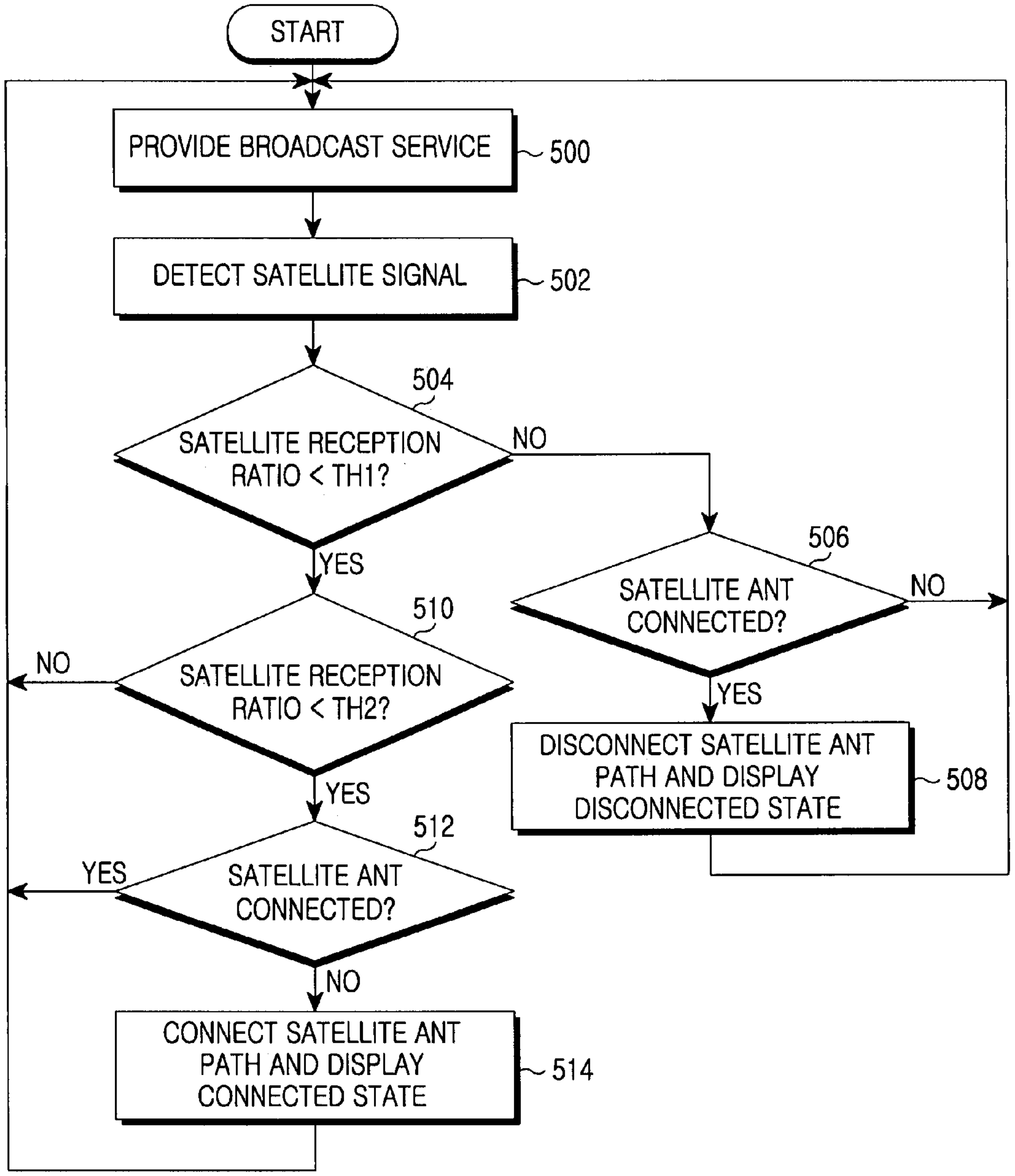
FIG. 5 is a flowchart illustrating a method for controlling attachment/detachment of an external antenna for a DMB broadcast service in a mobile terminal according to the present invention.

FIG. 5 is a flowchart illustrating a method for controlling attachment/detachment of an external antenna for a DMB broadcast service in a mobile terminal according to a third embodiment of the present invention.

In step 500, the controller 216 provides a broadcast service, and the broadcast service can use the signals received from the DMB satellite 106 and the gap filler 108. While receiving the broadcast signals, the controller 216 monitors the satellite signal in step 502. The monitoring of the satellite signal includes monitoring the frequency of reception of the satellite signal, which has been described with reference to FIGS. 3 and 4.

In step 504, the controller 216, while monitoring the frequency, determines if the reception ratio of the satellite signals is less than a first threshold. This is because if the ratio of the signals received from the DMB satellite 106 is less than the first threshold, the user should not use the satellite antenna (i.e. external antenna 212). If it is determined that the ratio of the signals received from the DMB satellite 106 is less than the first threshold, the controller 216 determine in step 506 whether the satellite antenna is connected. If it is determined in step 506 that the satellite antenna is connected, the controller 216 proceeds to step 508 where it generates a switching control signal for disconnecting a satellite antenna path and outputs the generated switching control signal to the connector combiner 214. Further, in step 508, the controller 216 displays an emoticon or message indicating the disconnection of the satellite antenna on the display 218 for the user. The displaying step is optional.

However, if it is determined in step 504 that the ratio of the signals received from the DMB satellite 106 is not less than the first threshold, the controller 216 determines in step 510 if the reception ratio of the satellite signals is greater than a second threshold, i.e. determines if the signals received from the DMB satellite 106 are of a sufficient power level to be used. If it is determined that the reception ratio of the satellite signals is greater than the second threshold, the controller 216 determines in step 512 if the satellite antenna is connected. If it is determined that the satellite antenna is not connected, the controller 216 proceeds to step 514 where it connects the satellite antenna path and displays the connected state on the display 218. This displaying step is also optional.

With the use of this method, the user can control the connection state of the satellite antenna without manually attaching/detaching the satellite antenna. The user can previously set one of an automatic mode and a manual mode, and then the controller 216 can perform one of the automatic operation of FIG. 5 and the manual operation of FIG. 3 or 4 according to the set mode.

As can be understood from the foregoing description, the present invention provides the user with attachment/detachment recommend information of the external antenna, to thereby prevent the attachment of the external antenna from deteriorating the reception performance. In addition, if there is a need for attaching the external antenna to improve the overall reception performance, the present invention recommends the user to attach the external antenna, thereby contributing to maintenance of the good reception performance.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for receiving a Digital Multimedia Broadcasting (DMB) signal by a mobile terminal in a DMB system including a satellite for transmitting a satellite DMB signal directly to the mobile terminal, a gap filler for repeating the satellite DMB signal received from the satellite and transmitting a terrestrial DMB signal to the mobile terminal, and the mobile terminal capable of receiving both the satellite DMB signal and the terrestrial DMB signal, the method comprising:

receiving at least one DMB signal;

determining if there is a satellite DMB signal among the at least one DMB signal;

if there is the satellite DMB signal calculating a reception frequency of the satellite DMB signal for a stated time; and if the reception frequency is less than or equal to a threshold providing a user with a message recommending detachment of an antenna used for receiving the satellite DMB signal.

2. The method of claim 1, wherein the DMB signal comprises at least one of a gap filler identifier (ID) and a satellite ID.

3. The method of claim 2, wherein the determining of whether there is any satellite DMB signal is performed using an ID included in the DMB signal.

4. The method of claim 1, wherein the reception frequency is measured as a ratio of the satellite DMB signals to the terrestrial DMB signals.

5. The method of claim 1, wherein the procedure is performed when the antenna used for receiving the satellite DMB signal is attached.

6. The method of claim 1, further comprising:

if the reception frequency is less than the threshold determining if the antenna used for receiving the satellite DMB signal is attached; and performing the control according to attachment of the antenna used for receiving the satellite DMB signal.

7. The method of claim 1, further comprising:

if the reception frequency is greater than the threshold determining if the antenna used for receiving the satellite DMB signal is attached; and if the antenna used for receiving the satellite DMB signal is not attached providing the user with a message recommending attachment of the antenna used for receiving the satellite DMB signal.

8. The method of claim 1, further comprising:

if the reception frequency is greater than or equal to a second threshold determining if the antenna used for receiving the satellite DMB signal is attached; and if the antenna used for receiving the satellite DMB signal is not attached providing the user with a message recommending attachment of the antenna used for receiving the satellite DMB signal.

9. An apparatus for receiving a Digital Multimedia Broadcasting (DMB) signal by a mobile terminal in a DMB system including a satellite for transmitting a satellite DMB signal directly to the mobile terminal, a gap filler for repeating the satellite DMB signal received from the satellite and transmitting a terrestrial DMB signal to the mobile terminal, and the mobile terminal capable of receiving both the satellite DMB signal and the terrestrial DMB signal, the apparatus comprising:

an antenna for receiving the satellite DMB signal;

an antenna for receiving the terrestrial DMB signal;

a DMB signal processor for converting the received DMB signals into user data;

a controller for calculating a reception frequency of the satellite DMB signal for a stated time if there is a satellite DMB signal among the received DMB signals, and generating a detach command for the antenna for receiving the satellite DMB signal if the reception frequency is less than or equal to a threshold; and a display for displaying a message recommending detachment of the antenna for receiving the satellite DMB signal according to the detach command received from the controller.

10. The apparatus of claim 9, wherein the DMB signal comprises at least one of a gap filler identifier (ID) and a satellite ID.

11. The apparatus of claim 10, wherein the controller determines whether there is a satellite DMB signal, using an ID included in the DMB signal.

12. The apparatus of claim 9, wherein the reception frequency is measured as a ratio of the satellite DMB signals to the terrestrial DMB signals.

13. The apparatus of claim 9, wherein the controller performs the control when the antenna for receiving the satellite DMB signal is attached.

14. The apparatus of claim 13, further comprising:

a connector combiner for connecting the antenna for receiving the satellite DMB signal to the mobile terminal; and an antenna connector connected to the connector combiner, for determining attachment of the antenna for receiving the satellite DMB signal.

15. The apparatus of claim 9, wherein the controller determines if the antenna for receiving the satellite DMB signal is attached, if the reception frequency is less than the threshold, and performs the control according to attachment of the antenna for receiving the satellite DMB signal.

16. The apparatus of claim 9, wherein the controller determines if the antenna for receiving the satellite DMB signal is attached, if the reception frequency is greater than the threshold, and displays a message recommending attachment of the antenna for receiving the satellite DMB signal, if the antenna for receiving the satellite DMB signal is not attached.

17. The apparatus of claim 9, wherein the controller determines if the antenna for receiving the satellite DMB signal is attached, if the reception frequency is greater than or equal to a second threshold, and displays a message recommending attachment of the antenna for receiving the satellite DMB signal, if the antenna used for receiving the satellite DMB signal is not attached.

* * * * *